United States Patent
Hemann

[11] Patent Number: 6,142,591
[45] Date of Patent: Nov. 7, 2000

[54] SWITCH CABINET

[75] Inventor: Dirk Hemann, Greifenstein, Germany

[73] Assignee: Rittal-Werk Rudolf Loh GmbH & Co. KG, Herborn, Germany

[21] Appl. No.: 09/295,119

[22] Filed: Apr. 19, 1999

[30] Foreign Application Priority Data

Apr. 20, 1998 [DE] Germany .......................... 198 17 386

[51] Int. Cl.[7] .................................................. A47B 81/06
[52] U.S. Cl. .................... 312/223.1; 361/832; 312/265.4
[58] Field of Search ............................. 312/265.6, 265.5, 312/265.2, 265.3, 204, 223.1, 265.4, 257.1; 211/190, 26; 361/727, 730, 732, 733, 605, 684, 685, 683, 810, 829, 753, 756, 731

[56] References Cited

U.S. PATENT DOCUMENTS

| 19,069 | 1/1858 | Burton | 312/263 |
|---|---|---|---|
| 3,230,025 | 1/1966 | Hamilton et al. | 312/265.4 |
| 3,870,388 | 3/1975 | Logren | 312/265.1 |
| 4,448,463 | 5/1984 | Amos | 312/204 |
| 5,095,403 | 3/1992 | Pin et al. | 361/832 |
| 5,414,590 | 5/1995 | Tajali | 361/832 |

FOREIGN PATENT DOCUMENTS

| 13263 | 5/1957 | Germany . | |
|---|---|---|---|
| 36 11 693 C1 | 5/1987 | Germany . | |
| 2249714 | 5/1992 | United Kingdom | 312/265.3 |

OTHER PUBLICATIONS

*Hoffman Schroff Katalog für die Elektronik 96/97*, pp. 11.06–11.07, Aug. 1996, Schroff GMBH, Straubenhardt, Germany.

*Primary Examiner*—Peter M. Cuomo
*Assistant Examiner*—Jerry A. Anderson
*Attorney, Agent, or Firm*—Pauley Petersen Kinne & Fejer

[57] ABSTRACT

A switch cabinet with a rack having four vertical frame sections, in which an internal housing arranged in an interior of the switch cabinet is connected to the rack, which has two vertical side walls and an upper and a lower horizontal cover. In order to be able to install the internal housing simply in the switch cabinet, the vertical side walls are attached to the vertical frame sections and each has an upper and a lower longitudinal guide that runs in the direction of the cabinet depth. The cover can be pushed into the longitudinal guides via the open front side of the rack with guide elements and secured to them.

16 Claims, 2 Drawing Sheets

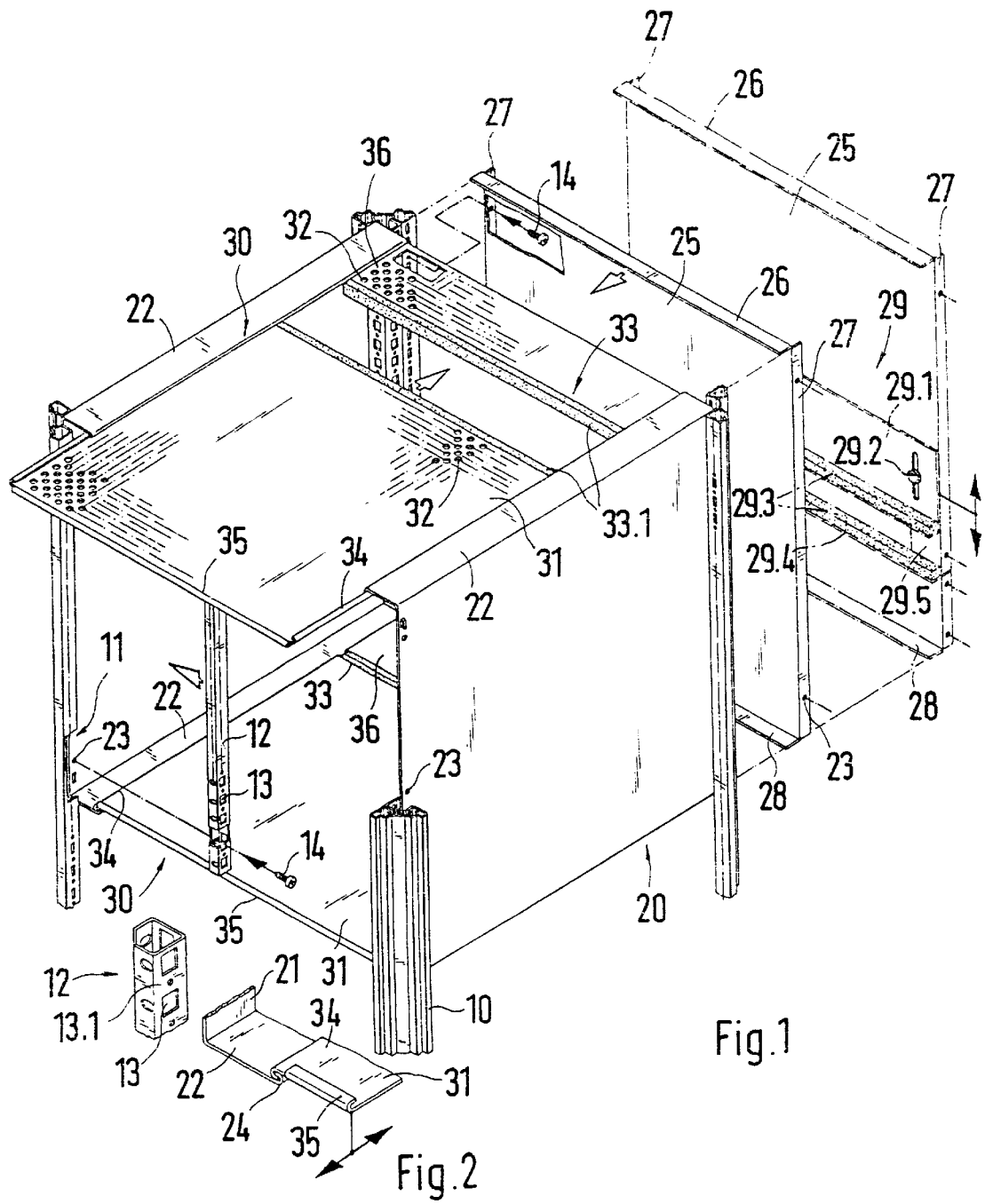

SWITCH CABINET

BACKGROUND OF THE INVENTION

1. Field of the Invention

This invention relates to a switch cabinet with a rack having four vertical frame sections, in which an internal housing arranged in an interior of the switch cabinet is connected to the rack, which has two vertical side walls and an upper and lower horizontal cover.

2. Description of Prior Art

This general type of switch cabinet is known from German Patent Reference DE 36 11 693 C1. For HF shielding, a box-like internal housing is introduced in the interior space enclosed by the rack. This internal housing has two vertical side walls which are rigidly connected to both horizontal covers. The unit so premounted can be introduced through the open front side of the rack into the switch cabinet interior and attached to the rack. In the incorporated state the front and back sides of the rack coincide with the corresponding open sides of the internal housing. The switch cabinet has front and rear cabinet doors, which in the closed state cover the open sides of the internal housing.

SUMMARY OF THE INVENTION

It is one object of this invention to provide a switch cabinet of the type mentioned above, in which the internal housing can be installed in simple fashion in the interior of the switch cabinet.

This object of this invention is achieved with vertical side walls that are attached to the vertical frame sections and each has an upper and lower longitudinal guide running in the direction of the cabinet depth, and the covers over the open front side of the rack with guide elements are inserted into the longitudinal guides and secured to them.

For installation of the internal housing, the side walls are first attached to the vertical frame sections. The covers can then be pushed into the longitudinal guides. The individual components of the internal housing can be handled simply, so that installation can be carried out by a single person.

In one preferred embodiment of this invention, the side walls have bevelings directed toward the interior of the rack, bent back U-shaped on their free ends in order to form longitudinal guides. Covers are provided on the horizontal edges running in the direction of the cabinet depth with guide elements also designed as U-shaped bends. The U-shaped bends of the covers and the side walls are hooked into each other in the installed state. In this internal housing, the connection mechanism between the side walls and the cover is easily accomplished. In a switch cabinet according to this invention, at least one of the covers has at least two partial plates that are held one behind the other in the longitudinal guide and a cable bushing is arranged in the separation region between the two partial plates. The two partial plates can be pulled apart in the longitudinal guides for cable introduction. When the cables are introduced to the internal housing, the two partial plates are pushed together again and the cable bushing thus closed. The partial plates can have bevelings on their edge facing the cable bushing, on which seals running in the width direction of the rack are positioned. The seals thus are positioned tightly around the outside periphery of the cable. HF-tight shielding of the cable bushing is thus achieved.

Heat-generating components can be accommodated in the internal housing. In order for the formed heat to be carried away, it is conceivable for the covers to have a hole pattern through which a ventilation stream can pass. The geometry of the individual holes is then chosen so that HF-tight shielding of the internal housing remains guaranteed.

The internal housing can be closed on the back with a back wall, which is screwed to the corresponding vertical frame sections. The back wall can also have a cable bushing. The internal housing can be covered, for example, on the front with a closure plate. This can preferably be equipped with a mount that hooks into an undercut of the upper or lower cover with a shoulder. Closures that can be locked on the internal housing or on the rack are provided to secure the closure plate. In order to be able to simply attach components in the interior of the internal housing, a switch cabinet according to this invention has vertically running assembly rails that are connected to the vertical frame sections in the corner regions of the internal housing. The vertical assembly rails can have fastening mounts. The electrical components or corresponding mounts can be screwed to the fastening mounts.

BRIEF DESCRIPTION OF THE DRAWINGS

This invention is further explained below with reference to a practical example depicted in the drawings wherein:

FIG. 1 shows an exploded perspective view of four vertical frame sections of a rack and an internal housing incorporated between the frame sections;

FIG. 2 shows an enlarged detail view of components of FIG. 1; and

DESCRIPTION OF PREFERRED EMBODIMENTS

Figure 3:
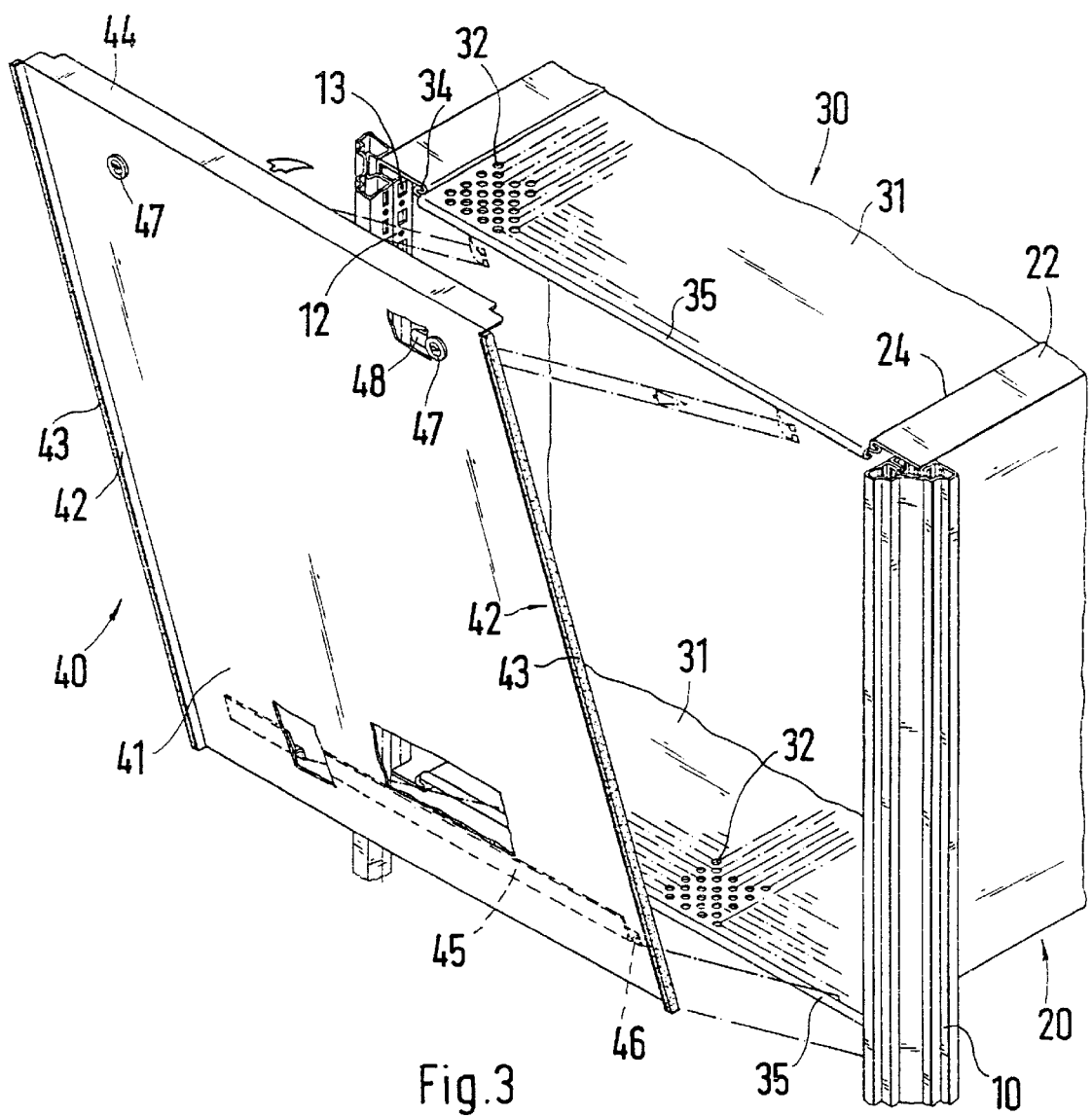
FIG. 3 shows a perspective view of the internal housing according to FIG. 1, with a closure plate.

Four sections of vertical frame sections 10 of a rack are shown in FIG. 1. An internal housing can be fastened to the vertical frame section 10. The internal housing has two vertical side walls 20, which have holes 23 on their vertical edges. The side walls 20 can be screwed to the corresponding vertical frame sections 10 via these holes 23. Bevelings 22 are bent horizontally from the horizontal edges of the side wall 20. The bevelings 22 are rolled U-shaped on their free edges and form longitudinal guides 24. The design of the longitudinal guides 24 are shown in detail in FIG. 2, which shows a partial region of the internal housing in an enlarged detail. Covers 30 can be pushed into longitudinal guides 24 between the two side walls 20. The covers 30 have a hole pattern 32 that extends over the entire surface. The edges of covers 30 running in the depth direction of the rack are bent U-shaped and thus form guide elements 34. As shown in FIG. 2, the cover 30 can be pushed into the longitudinal guides 24 of the side walls 20 via the open front side of the rack with its guide elements 34. The covers 30 are bent on the front side so that undercuts 35 are produced. The undercuts 35 are directed toward the interior of the internal housing. In order to form cable bushings 33, the covers 30 are formed in two parts from two partial plates 31, 36. The two partial plates 31, 36 are pushed one behind the other into the longitudinal guides 24. The partial plates 31, 36 have bevelings on their region facing the cable bushing 33. Seals 33.1, such as foam seals, are glued onto these. The two partial plates 31, 36 are pushed apart for cable introduction. The cables can then be simply introduced to the internal housing. The two partial plates 31, 36 are then pushed back together. The seals 33.1 are positioned around the outside contour of the introduced cable. On the back side, the internal housing can be closed with a back wall 25. The back wall 25 is made from a flat steel sheet cut-out and has shoulders 26, 28 on both of its horizontal edges. The shoulders 26, 28 overlap the partial plates 36 of cover 30 and form an HF-tight closure. Fastening sections 27 are bent from the back wall 25 on its vertical edges. The back wall 25 can be screwed to the vertical frame section 10 with the fastening sections 27. For this purpose the fastening sections 27 have holes 23. Fastening screws 14 are introduced through the holes 23 and screwed into correspondingly designed threaded mounts of the vertical frame sections. As shown in FIG. 1, different back walls 25 can be fastened to the internal housing. In the dashed depiction, the back wall 25 is shown equipped with a cable bushing 29. For this purpose the back wall 25 is again divided in two. The lower back wall part 25 has a horizontal beveling 29.4 to which the foam sealing 29.3 is glued. A control unit 29.1 is fastened to longitudinal guides 29.2 on the upper back wall part 25. For opening and closing of the cable bushing 29, the control unit 29.1 can be pushed in the vertical direction.

In order to be able to attach components in the interior of the internal housing, vertical assembly rails 12 are used. The assembly rails 12 can be set up in the corner regions of the internal housing. For this purpose the vertical frame sections 10 have an internal mount 11 into which the assembly rails 12 are inserted. Fastening screws 14 that are screwed into the fastening mounts of the vertical frame section 10 are used to attach the assembly rails 12. As can be gathered from FIG. 2, the assembly rails 12 have two section sides 13.1 facing each other at an angle, which are directed toward the interior of the internal housing and are at right angles to the facing outsides of the rack. Rows of fastening mounts 13 are introduced at a spacing from each other in a pattern into the section sides 13.1. A three-dimensional attachment grid on which electrical components can be mounted directly or via mounts is achieved in the internal space of the internal housing with the fastening mounts 13.

The internal housing can be closed in the front with a closure plate 40. The closure plate 40 has a flat wall 41 provided on its vertical edges with sealing connectors 42. HF seals 43 are applied to the sealing connector 42 and can be in contact with the sealing edges or sealing connectors of the vertical frame section 10. The upper horizontal edge of wall 41 has a beveling 44, which lies on the partial plate 31 of the upper cover 30. In the region of the lower horizontal edge the closure plate 40 has a mount 45 with a shoulder 46. The shoulder 46 engages behind undercut 35. A hinge-like connection is thus formed between the lower cover 30 and the closure plate 40. When the closure plate 40 is hooked in, it can be tilted into the vertical installation position. Two closures 47 are provided for locking of closure plate 40. These closures 47 are equipped with turnbuckles 48. The turnbuckles 48 can be turned behind the undercuts 35 of partial plate 31 of the upper cover 30.

What is claimed is:

1. In a switch cabinet having a rack with four vertical frame sections, in which an internal housing is arranged in an interior of the switch cabinet and is connected to the rack, having two vertical side walls, an upper horizontal cover and a lower horizontal cover, the improvement comprising:

the vertical side walls (20) attached to the vertical frame sections (10) and each said side wall having an upper and a lower longitudinal guide (24) positioned in a direction of a cabinet depth, and the covers (30) having a plurality of secured guide elements (34) inserted into the longitudinal guides (24) by way of an open front side of the rack.

2. In the switch cabinet according to claim 1, wherein the side walls (20) have a plurality of bevelings (22) directed toward the interior of the rack, which are bent back and U-shaped on free ends to form the longitudinal guides (24), and the covers (30) have the guide elements (34) designed as a U-shaped bend on horizontal edges running in the direction of the cabinet depth and the U-shaped bends of the covers (30) and the side walls (20) are hooked into each other in an assembled state.

3. In the switch cabinet according to claim 2, wherein at least one of the covers (30) has at least two partial plates (31, 36) secured one behind the other in the longitudinal guides (24) and a cable bushing (33) is arranged in a separation region between the two partial plates (31, 36).

4. In the switch cabinet according to claim 3, wherein the partial plates (31, 36) have bevelings on an edge facing the cable bushing (33) on which a plurality of seals (33.1) running in a width direction of the rack are applied.

5. In the switch cabinet according to claim 4, wherein the covers (30) have a hole grid (32) through which a ventilation stream can pass.

6. In the switch cabinet according to claim 5, wherein the internal housing is closed on a back with a back wall (25) which is attached to the corresponding vertical frame sections (10).

7. In the switch cabinet according to claim 6, wherein the back wall (25) has a cable bushing (29).

8. In the switch cabinet according to claim 7, wherein an open front side of the internal housing is closed with a closure plate (40) hooked with a shoulder (46) of a mount (45) into an undercut (35) of the cover (30) and the closure plate (40) is locked by a plurality of closures (47) to one of the internal housing and the rack on a side facing away from the mount (45).

9. In the switch cabinet according to claim 8, wherein a plurality of vertically running assembly rails (12) are connected to the vertical frame sections (10) in corner regions of the internal housing.

10. In the switch cabinet according to claim 1, wherein at least one of the covers (30) has at least two partial plates (31, 36) secured one behind the other in the longitudinal guides (24) and a cable bushing (33) is arranged in a separation region between the two partial plates (31, 36).

11. In the switch cabinet according to claim 10, wherein the partial plates (31, 36) have bevelings on an edge facing the cable bushing (33) on which a plurality of seals (33.1) running in a width direction of the rack are applied.

12. In the switch cabinet according to claim 1, wherein the covers (30) have a hole grid (32) through which a ventilation stream can pass.

13. In the switch cabinet according to claim 1, wherein the internal housing is closed on a back with a back wall (25) which is attached to the corresponding vertical frame sections (10).

14. In the switch cabinet according to claim 13, wherein the back wall (25) has a cable bushing (29).

15. In the switch cabinet according to claim 1, wherein an open front side of the internal housing is closed with a closure plate (40) hooked with a shoulder (46) of a mount (45) into an undercut (35) of the cover (30) and the closure plate (40) is locked by a plurality of closures (47) to one of the internal housing and the rack on a side facing away from the mount (45).

16. In the switch cabinet according to claim 1, wherein a plurality of vertically running assembly rails (12) are connected to the vertical frame sections (10) in corner regions of the internal housing.

* * * * *